(12) United States Patent
Kuri et al.

(10) Patent No.: US 7,782,896 B2
(45) Date of Patent: Aug. 24, 2010

(54) WIRELESS COMMUNICATION APPARATUS AND WIRELESS COMMUNICATION METHOD

(75) Inventors: Kenichi Kuri, Kanagawa (JP); Akihiko Nishio, Kanagawa (JP); Daichi Imamura, Kanagawa (JP); Kenichi Miyoshi, Kanagawa (JP); Takashi Aramaki, Kanagawa (JP); Katsuhiko Hiramatsu, Kanagawa (JP)

(73) Assignee: Panasonic Corporation, Osaka (JP)

( * ) Notice: Subject to any disclaimer, the term of this patent is extended or adjusted under 35 U.S.C. 154(b) by 210 days.

(21) Appl. No.: 12/063,843

(22) PCT Filed: Aug. 18, 2006

(86) PCT No.: PCT/JP2006/316220
§ 371 (c)(1),
(2), (4) Date: Feb. 14, 2008

(87) PCT Pub. No.: WO2007/020996
PCT Pub. Date: Feb. 22, 2007

(65) Prior Publication Data
US 2009/0109999 A1 Apr. 30, 2009

(30) Foreign Application Priority Data
Aug. 19, 2005 (JP) ............................. 2005-238781
Sep. 30, 2005 (JP) ............................. 2005-287620

(51) Int. Cl.
*H04J 3/16* (2006.01)
(52) U.S. Cl. ...................... 370/465; 370/203; 370/437; 370/468
(58) Field of Classification Search ................. 370/465, 370/203, 208, 238, 343, 344, 437, 468
See application file for complete search history.

(56) References Cited

U.S. PATENT DOCUMENTS

2003/0043928 A1* 3/2003 Ling et al. .................. 375/267
2004/0139897 A1 7/2004 Nakaya (Continued)

FOREIGN PATENT DOCUMENTS

JP 2004-158901 6/2004

(Continued)

OTHER PUBLICATIONS

International Search Report dated Nov. 21, 2006.

(Continued)

*Primary Examiner*—Ricky Ngo
*Assistant Examiner*—Luat Phung
(74) *Attorney, Agent, or Firm*—Dickinson Wright PLLC

(57) ABSTRACT

Provided is a wireless communication apparatus by which the maximum throughput can be obtained while satisfying required reception qualities in multicarrier communication. In the apparatus, a coding section (101) performs error correction coding to all of the plurality of resource blocks at a same coding rate, modulating sections (103-1 to 103-n) generate data symbols by modulating coding data for each of the resource blocks (1 to n), and repetition sections (104-1 to 104-n) repeat the data symbols inputted from the modulation section (103) for each of the resource blocks (1 to n) to generate a plurality of same data symbols. Namely, while the coding rate is same in all of the resource blocks, modulation system and the number of repetitions differ by resource block.

17 Claims, 18 Drawing Sheets

U.S. PATENT DOCUMENTS

2004/0141481 A1 7/2004 Lee
2005/0128993 A1* 6/2005 Yu et al. .................... 370/342
2005/0276242 A1* 12/2005 Goto et al. ................. 370/328
2006/0062140 A1 3/2006 Sudo
2007/0016654 A1* 1/2007 Bowles et al. .............. 709/217

FOREIGN PATENT DOCUMENTS

| JP | 2004-187226 | 7/2004 |
| JP | 2004-221773 | 8/2004 |
| JP | 2004-248005 | 9/2004 |

OTHER PUBLICATIONS

3GPP TSG RAN WG1 Ad Hoc on LTE, R1-050590, "Physical Channels and Multiplexing in Evolved UTRA Downlink,"Sophia Antipolis, Jun. 2000. p. 3, lines 15-17.

L. Medina, et al., "Proposal of OFDM System with Data Repetition," Vehicular Technology Conference, IEEEVTS-Fall VTC, Sep. 28, 2000, pp. 352-357.

3GPP TSG RAN WG1 Ad Hoc on LTE, R1-050604, "Downlink Channelization and Multiplexing for EUTRA,"Sophia Antipolis, Jun. 2000, pp. 1-9. p. 3, lines 11-13.

* cited by examiner

| SINR | MODULATION SCHEME | RF |
|---|---|---|
| SINR < F | QPSK | 4 |
| F ≦ SINR < E | QPSK | 2 |
| E ≦ SINR < D | QPSK | 1 |
| D ≦ SINR < C | 16QAM | 1.5 |
| C ≦ SINR < B | 16QAM | 1 |
| B ≦ SINR < A | 64QAM | 1.2 |
| A ≦ SINR | 64QAM | 1 |

FIG.3

| SINR OF RB #1 | INR OF RB #1 | SINR OF RB #2 | INR OF RB #2 | ...... | SINR OF RB #N | INR OF RB #N |

FIG.8

| COMMON INR IN ALL RB | SINR OF RB #1 | SINR OF RB #2 | ... | SINR OF RB #N |

FIG.9

| SINR | MODULATION SCHEME | RF |
|---|---|---|
| SINR < F | 16QAM | 8 |
| F ≦ SINR < E | 16QAM | 4 |
| E ≦ SINR < D | 16QAM | 2 |
| D ≦ SINR < C | 64QAM | 2 |
| C ≦ SINR < B | 64QAM | 1.5 |
| B ≦ SINR < A | 64QAM | 1.2 |
| A ≦ SINR | 64QAM | 1 |

FIG.10

| VARIATION PARAMETER | SINR | VARIATION | REPETITION |
|---|---|---|---|
| 0 | AVERAGE SINR OF ALL RESOURCE BLOCKS < AVERAGE SINR OF OBJECT RESOURCE BLOCKS | SMALL | BIT REPETITION |
| 1 | AVERAGE SINR OF ALL RESOURCE BLOCKS ≧ AVERAGE SINR OF OBJECT RESOURCE BLOCKS | LARGE | SYMBOL REPETITION |

FIG.16

WIRELESS COMMUNICATION APPARATUS AND WIRELESS COMMUNICATION METHOD

TECHNICAL FIELD

The present invention relates to a radio communication apparatus and a radio communication method.

BACKGROUND ART

In recent years, in radio communication, specifically, in mobile communication, various data such as image and data in addition to voice are targets for information transmission. Requests for high-speed transmission are anticipated to increase further in the future, and, to perform high-speed transmission, radio transmission techniques of using limited frequency resources efficiently and realizing high transmission efficiency are required.

One of techniques capable of responding to such requests is orthogonal frequency division multiplexing (OFDM). It is known that OFDM is a multicarrier transmission technique that transmits data in parallel using a number of subcarriers, has features including high frequency efficiency and reduced inter-symbol interference under the multi-path environment, and is effective to improve transmission efficiency.

When data for a plurality of radio communication mobile station apparatuses (hereinafter simply "mobile station") is frequency-multiplexed with a plurality of subcarriers, performing frequency scheduling is considered using this OFDM on the downlink (see Non Patent Document 1).

In frequency scheduling, a radio communication base station apparatus (hereinafter simply "base station") adaptively allocates subcarriers to respective mobile stations according to the received quality per frequency band of each mobile station, so that it is possible to obtain maximum multi-user diversity gain and perform communication quite efficiently. This frequency scheduling is suitable to data communication where the mobile station moves in a low-speed.

For acquiring multi-user diversity gain efficiently, the bandwidth for resource blocks needs to be set narrower than correlation bandwidth of channel response with respect to communication systems. However, if the bandwidth for resourceblocks is set narrower, the number of bits that can be transmitted per resource block decreases. Here, the resource block is the band of one subcarrier or a band grouping severalsubcarriers, and is a control unit of frequency schedulingand adaptive control.

Here, in error correcting encode such as turbo code, if the number of bits that can be transmitted per resource block decreases and the encoding block size becomes smaller, the error correcting performance is significantly degraded. Then, a technique is proposed for determining the size of encoding-block size to maximize the error correcting performance, dividing encoded transmission data into a plurality of resource blocks and transmitting these when frequency schedulingis performed using error correcting encoding, (see Non Patent Document 2). With this technique, error correcting encoding is performed for all of a plurality of resource blocks at the same coding rate, sequentially, the encoded data is divided into a plurality of resource blocks and the modulation scheme is adaptively controlled for each resource block according to the received quality.

Non-Patent Document 1: R1-050604 "Downlink Channelization and Multiplexing for EUTRA" 3GPP TSG RAN WG1 Ad Hoc on LTE, Sophia Antipolis, France, 20-21 Jun., 2005

Non-Patent Document 2: R1-050590, "Physical Channels and Multiplexing in Evolved UTRA Downlink", NTT DoCoMo, 3GPP TSG-RANWG1, 2005/06

DISCLOSURE OF INVENTION

Problems to be Solved by the Invention

Here, with the technique disclosed in above-described Non Patent Document 2, the target that is adaptively controlledon a per resource block basis is only the modulation scheme. Further, the available modulation scheme is limited (to, for example, the 64 QAM modulation scheme, the 16 QAM modulation scheme and the QPSK modulation scheme). By this means, with the technique disclosed in above-described Non-PatentDocument 2, delicate received quality and a delicate transmission rate may not be controlled, and, consequently, it may not be possible to yield maximum throughput and satisfythe required received quality.

It is therefore an object of the present invention to provide a radio communication apparatus and a radio communicationmethod capable of acquiring maximum throughput and satisfying required received quality.

Means for Solving the Problem

Advantageous Effect of the Invention

The radio communication apparatus of the present inventiondividing a plurality of subcarriers forming a multicarrier signal into a plurality of resource blocks and performingadaptive control per resource block, the radio communication apparatus employs a configuration having: an encodingsection that encodes all of the plurality of resource blocks at a same coding rate; a control section that controls a modulation scheme and a repetition factor per resource block; a modulating section that performs modulation per resourceblock using a controlled modulation scheme; and a repetition section that performs repetition per resource block using a controlled repetition factor.

According to the present invention, it is possible to yield maximum throughput and satisfy required received quality.

BRIEF DESCRIPTION OF DRAWINGS

FIG. 3 illustrates a reference table according to Embodiment1 of the present invention;

FIG. 8 illustrates a CQI format example (format example 1) according to Embodiment 2 of the present invention;

FIG. 9 illustrates a CQI format example (format example 2) according to Embodiment 2 of the present invention;

FIG. 10 illustrates a reference table according to Embodiment 2 of the present invention;

FIG. 16 is a table showing a deciding method according to Embodiment 4 of the present invention;

BEST MODE FOR CARRYING OUT THE INVENTION

Embodiments of the present invention will be described below in detail with reference to the accompanying drawings.

Embodiment 1

Figure 1:
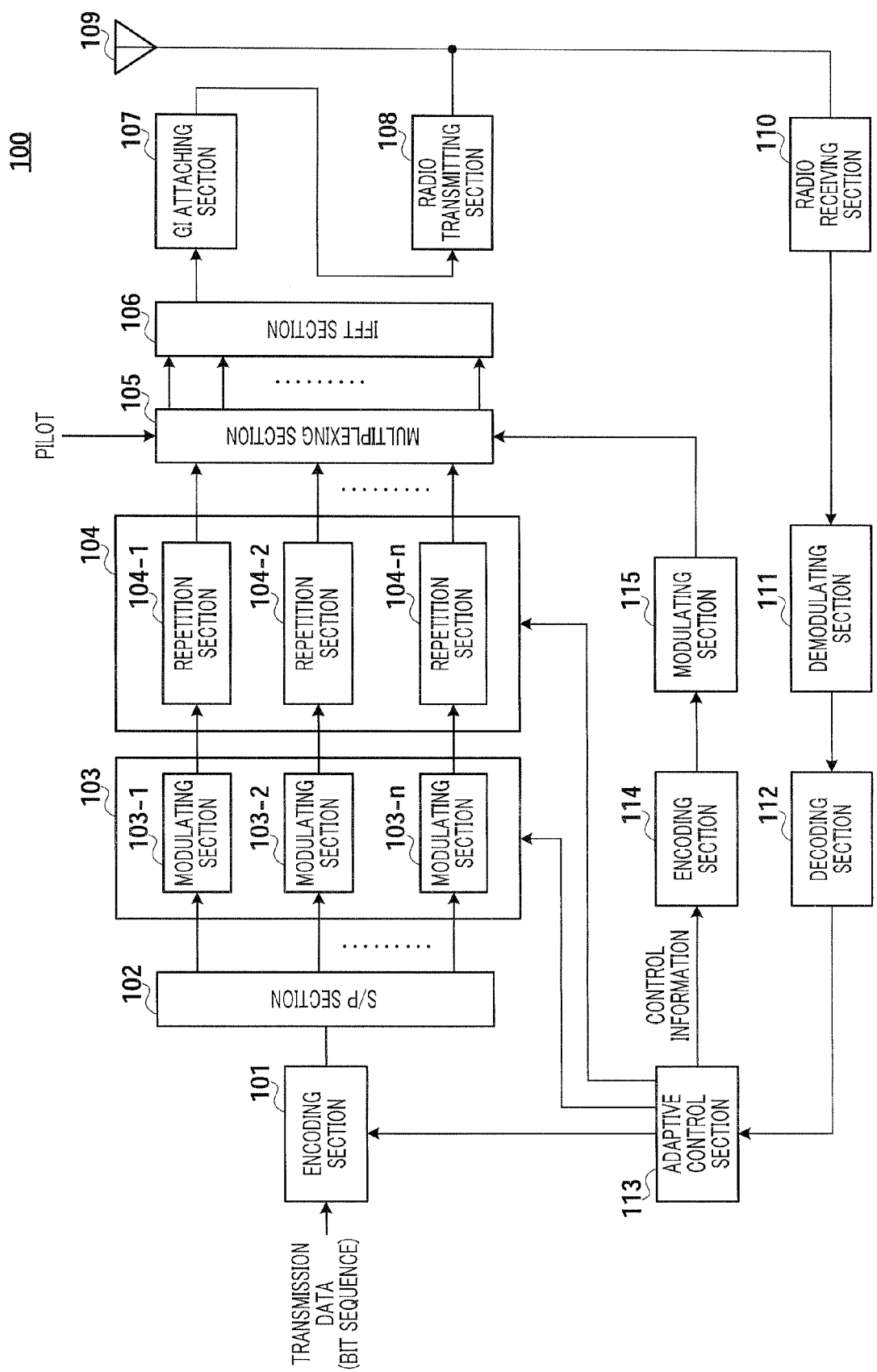
FIG. 1 is a block diagram showing a configuration of a radio communication apparatus on the transmitting side accordingto Embodiment 1 of the present invention.
Figure 2:
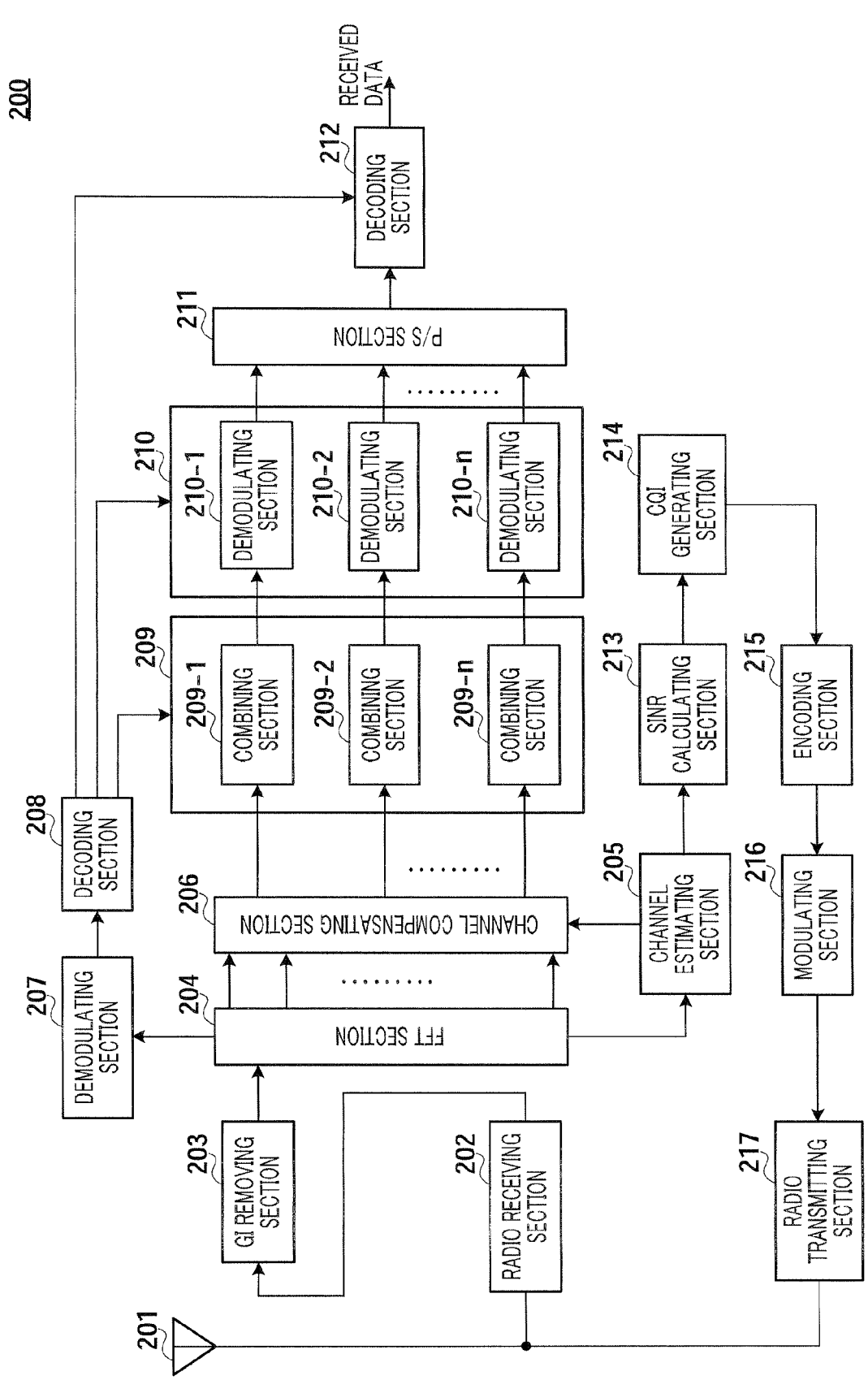
FIG. 2 is a block diagram showing a configuration of a radio communication apparatus on the receiving side according to Embodiment 1 of the present invention.

FIG. 1 illustrates the configuration of radio communication apparatus 100 on the transmitting side according to the present embodiment. FIG. 2 illustrates the configuration of radio communication apparatus 200 on the receiving side according to the present embodiment. Radio communication apparatus 100 divides a plurality of subcarriers forming an OFDM symbol, which is a multicarrier signal, into a plurality of resource blocks and performs adaptive control on a per resource block basis. Further, radio communication apparatus 200 receives the multicarrier signal, for which adaptive control is performed on a per resource block basis, and which is transmitted from radio communication apparatus 100.

In radio communication apparatus 100 shown in FIG. 1, encoding section 101 performs error correcting encoding on transmission data (bit sequence) at a coding rate that is common for all resource blocks inputted from adaptive control section 113, and outputs to S/P (serial/parallel) section 102 the transmission data after error correcting encoding. That is, encoding section 101 encodes all of a plurality of resource-blocks at the same coding rate.

S/P section 102 converts encoded data inputted from encoding section 101 in serial into encoded data in parallel and outputs the encoded data in parallel to modulating section 103.

Modulating section 103 is configured from modulating sections 103-1 to 103-n. Here, modulating sections 103-1 to 103-n are provided for the number of resource blocks, n, included in one OFDM symbol. Modulating sections 103-1 to 103-n each generate data symbols by modulating encoded data, inputted from S/P section 102, for each resource block 1 to n and output the generated data symbols to repetition section 104. Here, modulating sections 103-1 to 103-n each modulate resource blocks in the modulation scheme, inputted from adaptivecontrol section 113, on a per resource block basis. That is, while encoding section 101 encodes all of a plurality of resource blocks at the same coding rate, modulating section 103 modulates each resource block using the modulationscheme controlled by adaptive control section 113 on a per resource block basis.

Repetition section 104 is configured from repetition sections 104-1 to 104-n. Here, repetition sections 104-1 to 104-n are provided for the number of resource blocks, n, includedin one OFDM symbol. As an example of techniques for improving received quality in multicarrier transmission, there is the repetition technique. With the repetition technique,the transmitter repeats a symbol or bit (i.e. repetition), acquires a plurality of the same symbols or bits and transmits the symbols or bits to the receiver, and the receivercan acquire diversity gain by combining the same symbols or bits. Here, repetition sections 104-1 to 104-n each generate a plurality of the same data symbols by performing repetition on the data symbol, inputted from modulating section 103, for resource block 1 to n and output the data symbols to multiplexing section 105. In this case, repetition sections 104-1 to 104-n each perform repetition using the number of repetitions per resource block outputted from adaptivecontrol section 113. That is, while encoding section 101 encodes all of a plurality of resource blocks at the same coding rate, repetition section 104 performs repetition for each resource block using the number of repetitions per resourceblock controlled by adaptive control section 113. The number of repetitions will be referred to as "RF (Repetition Factor)" in the following explanation. In this case, the number of repetitions is the total number of repetition source symbols or bits and repeated symbols or bits generated by repetition. Accordingly, for example, when RF is 2, the number of repeated data symbols or bits generated by repetitionis one. Further, a plurality of data symbols or bits form one unit, referred to as "repetition unit" in the followingexplanation.

Multiplexing section 105 time-multiplexes the data symbol inputted from repetition section 104 with a pilot symbol and control information that is inputted from modulation section 115, and outputs this to IFFT (Inverse Fast Fourier Transform) section 106. By this means, the pilot symbol, the control information and the data symbol are assigned to each subcarriers. Here, the pilot symbol and control information is multiplexed on a per frame basis. Further, the multiplexing of control information may employ frequency-multiplexing. Further, the control information is transmitted in a SCCH (shared control channel).

IFFT section 106 performs an IFFT for a plurality of subcarriers where the pilot symbol, the control information and the data symbol are assigned, converts the subcarriers into the time domain, to generate an OFDM symbol which is a multicarrier signal, and inputs this OFDM symbol to GI attachingsection 107.

GI attaching section 107 attaches the same signal as the tail part of an OFDM symbol to the head of that OFDM symbol, as a GI (Guard Interval), and outputs the OFDM symbol with a GI to radio transmitting section 108.

Radio transmitting section 108 performs transmission processing such as D/A conversion, amplification and up-conversion for the OFDM symbol with a GI and transmits the OFDM symbol after the transmission processing from antenna 109 to radio communication apparatus 200 shown in FIG. 2.

Radio receiving section 110 receives the signal, including the CQI (Channel Quality Indicator) per resource block, transmitted from radio communication apparatus 200, via antenna 109 and performs reception processing such as down-conversion and A/D conversion on the received signal. The signal after reception processing is demodulated in demodulating section 111, is decoded in decoding section 112 and is inputted to adaptive control section 113.

Adaptive control section 113 performs adaptive control according to the CQI per resource block, reported from radio communication apparatus 200. That is, adaptive control section 113 adaptively controls the modulation scheme in modulating section 103 and the repetition factor in repetition section 104 on a per resource block basis according to the CQI of each resource block. Further, adaptive control section 113 adaptively controls the coding rate in encoding section 101 according to the average value of CQI per resource block. Further, adaptive control section 113 generates control information including the modulation scheme and the repetition factor per resource block and the coding rate which is common for all resource blocks, and outputs the control information to encoding section 114. This control information is encoded in encoding section 114, is modulated in modulation section 115 and is inputted to multiplexing section 105. By the way, the adaptive control will be described later in detail.

On the other hand, in radio communication apparatus 200 shown in FIG. 2, radio receiving section 202 receives the OFDM symbol transmitted from radio communication apparatus 100 shown in FIG. 1 via antenna 201, performs reception processing such as down-conversion and A/D conversion on the received OFDM symbol and outputs the OFDM symbol after reception processing to GI removing section 203.

GI removing section 203 removes the GI attached to the OFDM symbol and outputs the OFDM symbol without an GI to FFT (Fast Fourier Transform) section 204.

FFT section 204 converts the OFDM symbol inputted from GI removing section 203 into the frequency domain by performing an FFT, and acquires the pilot symbol, control information and the data symbol. FFT section 204 outputs the pilot symbol, the control information and the data symbol, to channel estimating section 205, demodulating section 207 and channel compensating section 206, respectively.

Demodulating section 207 demodulates the control information, and decoding section 208 decodes the demodulated control information. In the decoded control information, the repetition factor per resource block is inputted to combining section 209, the modulation scheme of each resource block is inputted to demodulating section 210, and the coding rate which is common for all resource blocks, is inputted to decoding section 212.

Channel estimating section 205 calculates the channel estimation value of each subcarrier using the pilot symbol per subcarrier, and outputs the channel estimation value to channel compensating section 206. Further, channel estimating section 205 detects the signal power value (S), interference power value (I) and noise power value (N) of the pilot symbol per subcarrier, and outputs these values to SINR (Signal to Interference and Noise Ratio) calculating section 213.

Channel compensating section 206 compensates the channel variation (amplitude variation and phase variation) of a data symbol using the channel estimation value per subcarrier, and outputs the data symbol after the channel variation is compensated to combining section 209.

Combining section 209 is configured from combining sections 209-1 to 209-n. Here, combining sections 209-1 to 209-n are provided for the number of resource blocks, n, included in one OFDM symbol Combining sections 209-1 to 209-n each combine the data symbols, inputted from channel compensating section 206, for each resource block 1 to n in repetition unit according to the repetition factor per resource block, inputted from decoding section 208, and output the combined data symbol to demodulating section 210.

Demodulating section 210 is configured from demodulating sections 210-1 to 210-n. Here, demodulating sections 210-1 to 210-n are provided for the number of resource blocks, n, included in one OFDM symbol. Demodulating sections 210-1 to 210-n each demodulate the data symbol, inputted from combining section 209, for each resource block 1 to n according to the modulation scheme per resource block, inputted from decoding section 208, and output the demodulated data to P/S (parallel/serial) section 211.

P/S section 211 converts the demodulated data, inputted in parallel from demodulating section 210, to serial data and outputs this data to decoding section 212.

Decoding section 212 decodes the demodulated data according to a coding rate that is common for all resource blocks, inputted from decoding section 208, and, consequently, yields the received data.

Next, SINR calculating section 213 calculates an average SINR on a per resource block basis, for received quality per resource block, from the signal power value (S), interference power value (I) and noise power value (N) that are inputted from channel estimating section 205, and outputs the calculated average SINR to CQI generating section 214.

CQI generating section 214 generates CQI showing the average SINR of each resource block. This CQI is encoded in encoding section 215, modulated in modulating section 216, and, after transmission processing such as D/A conversion, amplification and up-conversion is performed in radio transmitting section 217, is transmitted from antenna 201 to radio communication apparatus 100 shown in FIG. 1.

Next, adaptive control for a modulation scheme and the repetition factor will be described in detail below.

Adaptive control section 113 has the table shown in FIG. 3, that is, a table providing a plurality of combinations of modulation schemes and repetition factor (RF), and selects combinations according to SINR on a per resource block basis with reference to this table. For example, when the SINR shown by CQI is F≦SINR<E in a resource block, the QPSK modulation scheme and an RF of 2 are selected with respect to the resource block. Further, in this table, as shown in FIG. 3, different repetition factor are set with respect to a plurality of the same modulation schemes. For example, in FIG. 3, different repetition factor, 4, 2 and 1 are set with respect to three QPSKs. Therefore, adaptive control section 113 controls a plurality repetition factor with respect to one modulation scheme. For example, in FIG. 3, the repetition factor controlled with respect to the QPSK modulation scheme is one of 4, 2 and 1.

Further, in thresholds A to F for the SINR shown in this table, A is the highest value and F is the lowest value. That is, in the table shown in FIG. 3, for higher received quality, modulation schemes of higher M-ary modulation numbers are set to improve transmission rate. Further, in the same modulation scheme, for lower received quality, the higher repetition factor (RF) is set to improve diversity gain.

Further, in FIG. 3, when an RF of 1.2 or RF of 1.5 is selected, repetition is performed only for twenty percent or fifty percent of data symbols included in the resource block.

Figure 4:
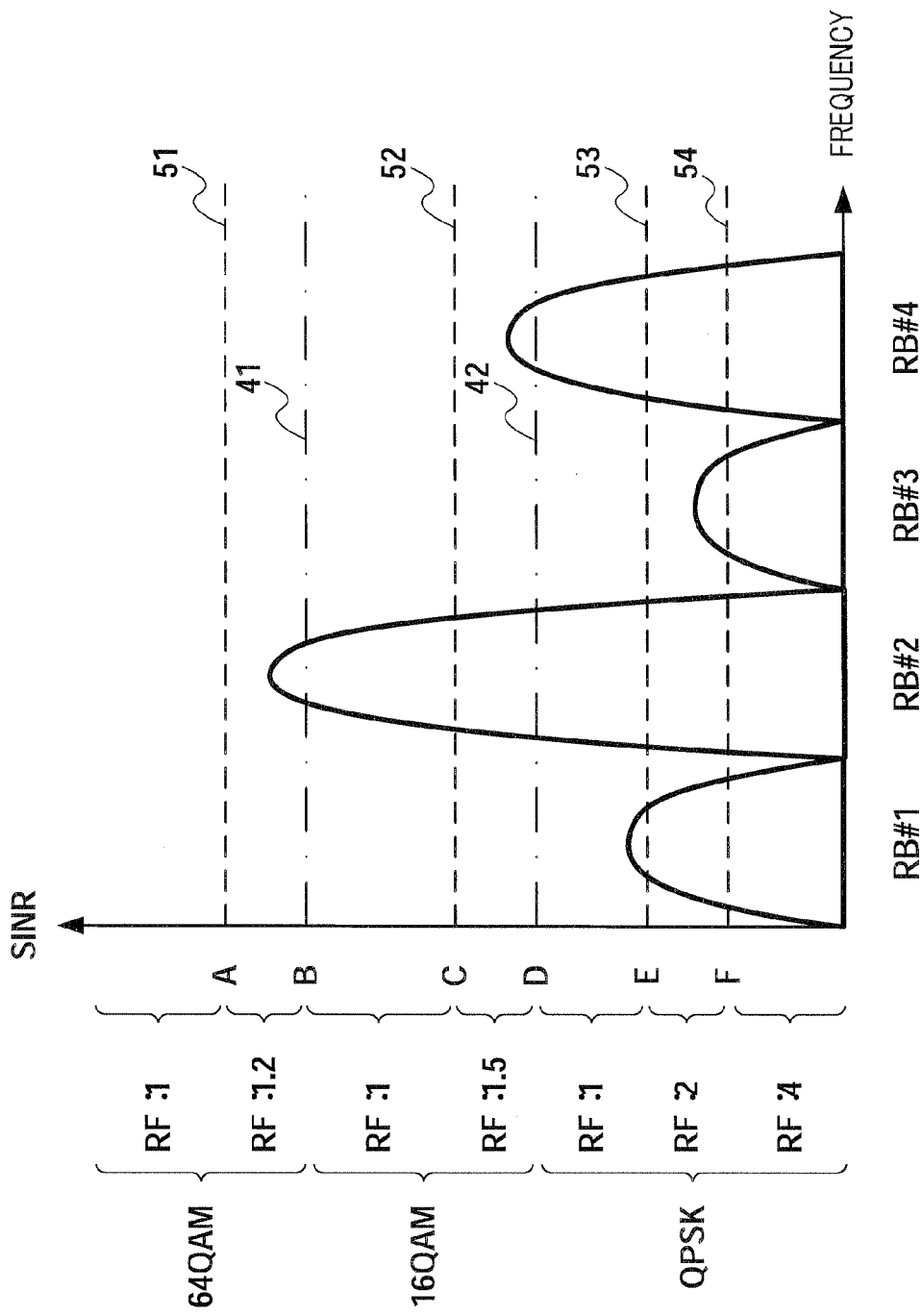
FIG. 4 illustrates an example of adaptive control accordingto Embodiment 1 of the present invention.

FIG. 4 illustrates an example of control in adaptive control section 113 according to the table shown in FIG. 3. FIG. 4 illustrates an example where a plurality of subcarriers included in one OFDM symbol are divided into four resource blocks RB #1 to RB #4. In this example, the SINR of RB #1 is E≦SINR<D, and, consequently, the QPSK modulation scheme and an RF of 1 are selected with respect to RB #1. In the same way, the 64 QAM modulation scheme and an RF of 1.2 are selected with respect to RB #2, the QPSK modulation scheme and an RF of 2 are selected with respect to RB #3, and the 16 QAM modulation scheme and an RF of 1.5 are selected with respect to RB #4. As described above, according to the present embodiment, thresholds 51, 52, 53 and 54, which are selection criterion for the repetition factor, are provided in addition to thresholds 41 and 42, which are selection criterion for the modulation scheme.

As described above, according to the present embodiment, more delicate setting of SINR thresholds are possible compared to the related art, so that it is possible to control more delicate received quality and more delicate transmission rate in a same modulation scheme. Therefore, according to the present embodiment, delicate received quality and delicate transmission rate can be controlled in response to small changes of channel condition, so that it is possible to satisfy required received quality and yield maximum throughputat all times.

Figure 5:
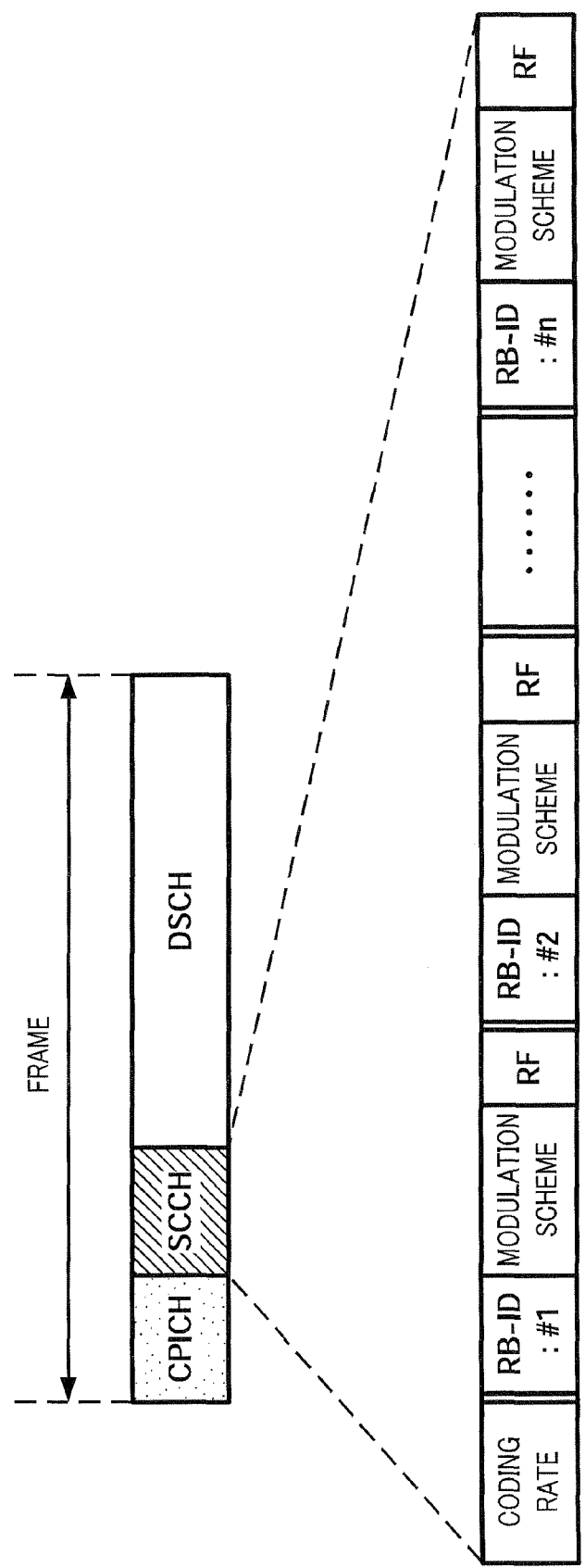
FIG. 5 illustrates a SCCH format example according to Embodiment 1 of the present invention.

Next, FIG. 5 illustrates a SCCH format example where control information is transmitted. When radio communication apparatus 100 is applied to a base station, a frame is configured from CPICH (Common Pilot Channel), SCCH and DSCH (Downlink Shared Channel). Here, the CPICH is a channel for a pilot symbol, the SCCH is a channel for control information and the DSCH is a channel for a data symbol. Further, the SCCH employs a format where the common coding rate for all resource blocks is set in the header first, followed by the combination of the resource block ID (RB-ID), the modulation scheme and the repetition factor (RF), on a per resource block basis.

Figure 6:
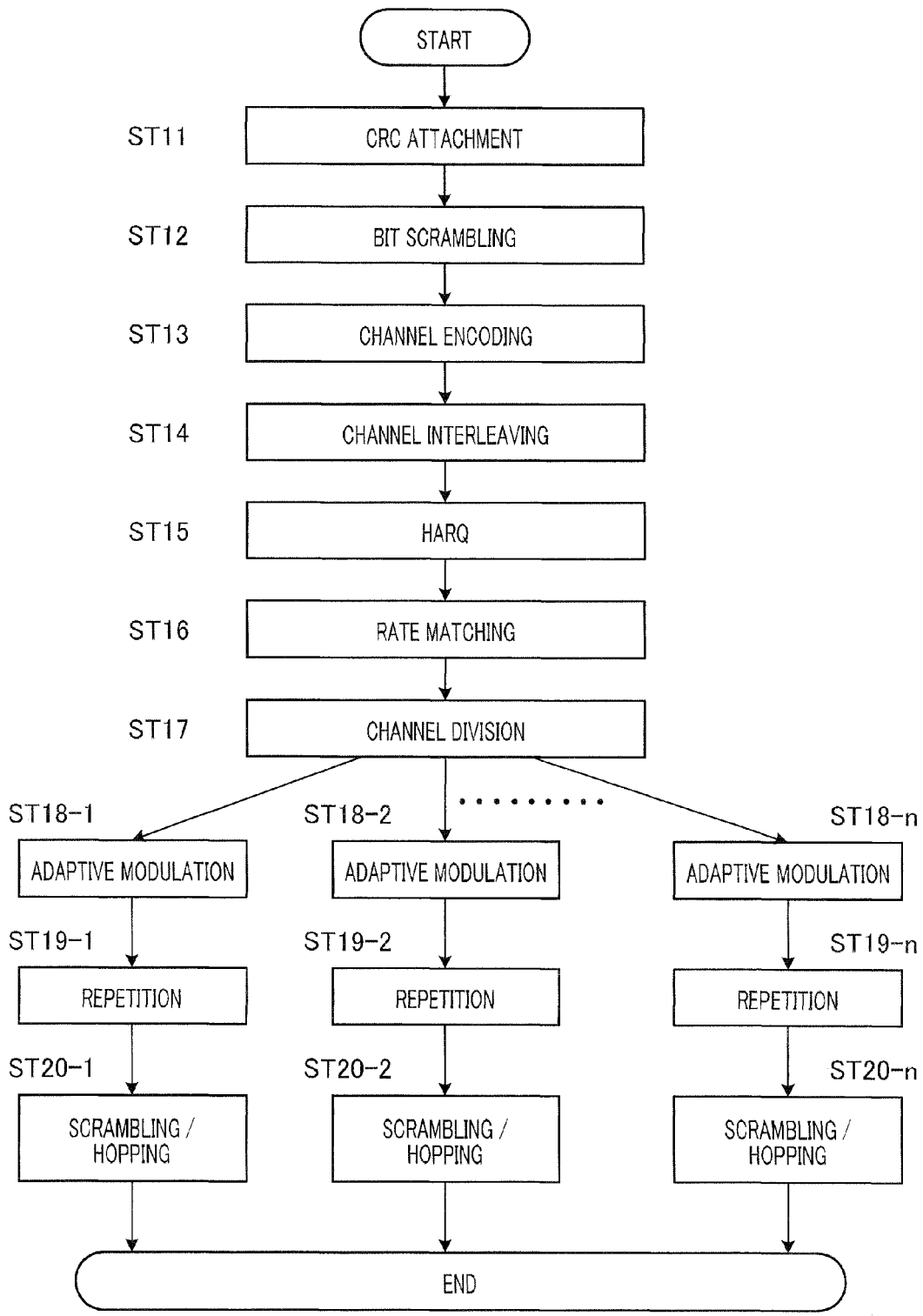
FIG. 6 illustrates a processing flow on the transmitting side according to Embodiment 1 of the present invention.

Next, FIG. 6 illustrates the processing flow on the transmitting side according to the present embodiment. In ST (step) 11, the CRC bit is attached to data from higher layers (the data link layer or above). In ST12, bit scrambling is performed if necessary. In ST13, channel encoding, that is, error correcting encoding is performed. In ST14, channel interleaving,that is, interleaving is performed on a per bit basis. In ST15, data is saved for HARQ (Hybrid ARQ). In ST16, rate matching is performed. Here, processing of ST11 to ST16 are performed for all resource blocks. That is, in ST13, all of a plurality of resource blocks are encoded at the same coding rate. Next, in ST 17, channel division is performed and data after the rate matching is divided into a plurality of resource blocks 1 to n. In ST 18-1 to ST 18-n, adaptive modulation is performed in parallel for each resourceblock 1 to n. In ST 19-1 to ST 19-n, repetition is performed in parallel for each of the plurality of resource blocks 1 to n. Finally, in ST 20-1 to ST 20-n, if necessary,processing such as scrambling and hopping is performed in parallel for each of the plurality of resource blocks 1 to n.

Embodiment 2

According to the present embodiment, adaptive control is performed using the INR (Interference to Noise Ratio) in addition to the SINR.

Figure 7:
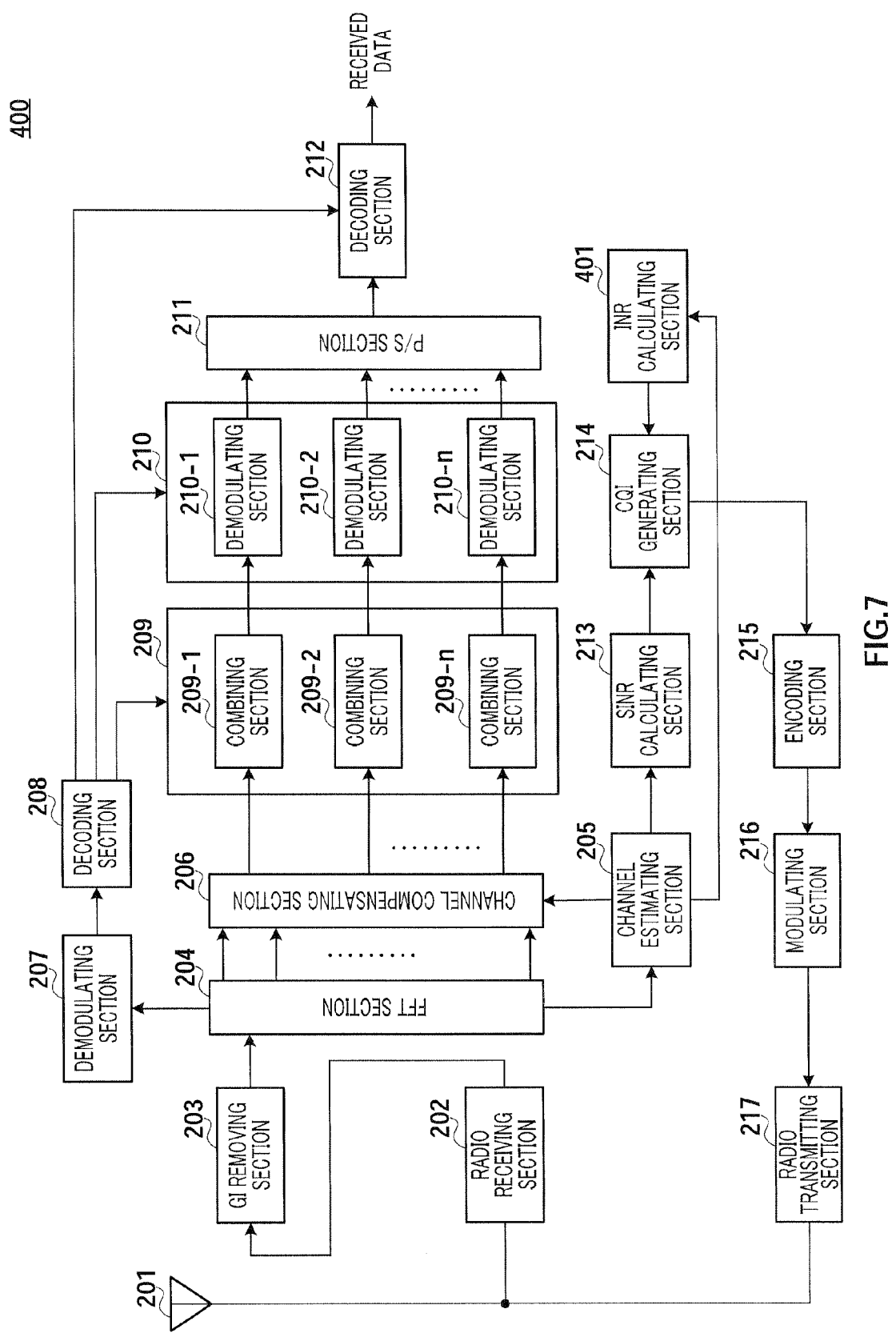
FIG. 7 is a block diagram showing a configuration of a radio communication apparatus on the receiving side according to Embodiment 2 of the present invention.

FIG. 7 shows the configuration of radio communication apparatus 400 on the receiving side according to the present embodiment. In the figure, the same components as in Embodiment1 (FIG. 2) are assigned the same numerals and explanationsthereof will be omitted.

Channel estimating section 205 calculates a channel estimation value per subcarrier using the pilot symbol of each subcarrier. These channel estimation values are inputtedto channel compensating section 206. Further, channel estimating section 205 detects the signal power value (S), interference power value (I) and noise power value (N) of the pilot symbol on a per subcarrier basis and outputs these values to SINR calculating section 213. Further, channel estimating-section 205 outputs the interference power value (I) and noise power value (N) to INR calculating section 401.

INR calculating section 401 calculates an average INR on a per resource block basis or an average INR of all subcarriers,for received quality per resource block, from the interference power value (I) and noise power value (N) inputtedfrom channel estimating section 205, and outputs the resultof calculation to CQI generating section 214.

CQI generating section 214 generates CQI showing the average SINR and average INR, and outputs the CQI to encoding section 215.

FIGS. 8 (format example 1) and 9 (format example 2) show CQI format examples. FIG. 8 is a format example where INR calculating section 401 calculates an average INR on a per resource block basis. In the format of FIG. 8, an average SINR and an average INR are set on a per resource block basis in order from resource block RB #1 to RB #n. On the other hand, FIG. 9 is a format example where INR calculating section 401 calculates the average INR of all subcarriers. In the format of FIG. 9, the average INR of all subcarriers is set first as the common INR for all resource blocks, followed by the average SIR per resource block in order from resource block RB #1 to RB #n. By using the format of FIG. 9, it is possible to reduce the amount of CQI information.

Next, adaptive control according to the present embodimentwill be described below in detail.

Under multi-path environment, both a desired signal and an interference signal are influenced by frequency selectivefading. By this means, when the INR is higher, increasingthe repetition factor is effective to improve diversity gain by symbol combination reducing the influence of interferencewaves. Further, when the repetition factor is further increased to prevent a decrease of transmission rate due to increase of the repetition factor, it is also preferable to increase the M-ary modulation number.

Therefore, according to the present embodiment, adaptivecontrol section 113 shown in FIG. 1 further has the table shown in FIG. 10 in addition to the table shown in FIG. 3. Comparing the table of FIG. 3 to the table of FIG. 10, although a plurality of combinations of modulation schemes and repetitionfactor (RF) are set in both figures, the set combinations of modulation schemes and repetition factor are different with respect to the same SINR. For example, in the range of C≦SINR<B, while the 16 QAM modulation scheme and an RF of 1 are set in the table of FIG. 3, the 64 QAM modulation scheme and an RF of 1.5 are set in the table of FIG. 10. That is, in the range of SINR<B, with respect to the same SINR, the M-ary modulation number of the modulation scheme set in the table of FIG. 10 is higher than the M-ary modulation number of the modulation scheme set in the table of FIG. 3. Further, in the range of SINR<B, with respect to the same SINR, the repetitionfactor set in the table of FIG. 10 is higher than the repetition factor set in the table of FIG. 3.

Adaptive control section 113 changes the reference table according to the INR indicated by the CQI. When the INR is equal to or higher than the threshold (in the case of high INR), adaptive control section 113 refers the table of FIG. 10. When the INR is lower than the threshold (in the case of low INR), adaptive control section 113 refers to the table of FIG. 3. Therefore, when adaptive control section 113 selects one of a plurality of combinations of modulation schemes and repetition factor according to the SINR, adaptive control section 113 changes the combinations for the same SINR, depending on whether the INR is high or low. That is, for a higher INR, adaptive control section 113 selects combinationsof higher M-ary modulation numbers and higher repetitionfactor for the same SINR.

Although a case has been described with the above explanation where adaptive control section 113 has two tables, a plurality of INR thresholds may be set and adaptive control section 113 may provide more tables which vary per INR.

As described above, according to the present embodiment, when the SINR is the same, if interference power (I) is predominant over noise power (N) and the INR increases, adaptive control is performed using modulation schemes with higher M-ary modulation numbers and higher repetition factor, so that, when the INR is higher, the radio communication apparatus on the receiving side improves received quality, and consequently satisfies the required received quality and yields maximum throughput.

Embodiment 3

The present embodiment differs from Embodiment 1 in that bit repetition is performed instead of symbol repetition.

Figure 11:
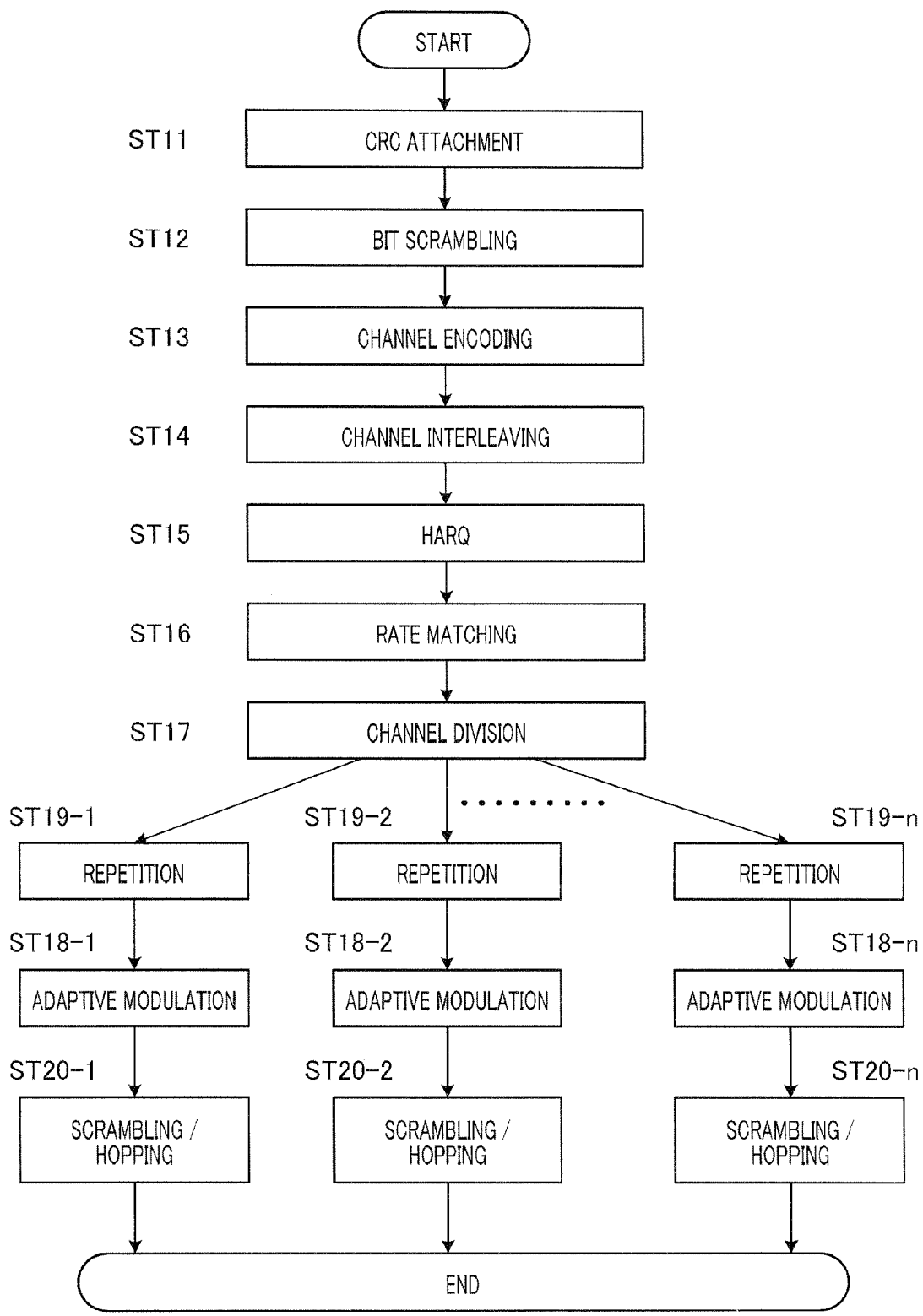
FIG. 11 is a processing flow on the transmitting side according to Embodiment 3 of the present invention.

FIG. 11 illustrates the processing flow on the transmitting-side according to the present embodiment. The processing flow of FIG. 11 differs from Embodiment 1 (FIG. 6) in that the order of performing the processing of adaptive modulation (ST 18-1 to 18-n) and repetitions (ST 19-1 to 19-n) is reverse, that is, adaptive modulation is performed after repetitions. Therefore, while symbol repetition is performed in ST 19-1 to 19-n in FIG. 6, bit repetition is performed in ST 19-1 to 19-n in FIG. 11.

Figure 12:
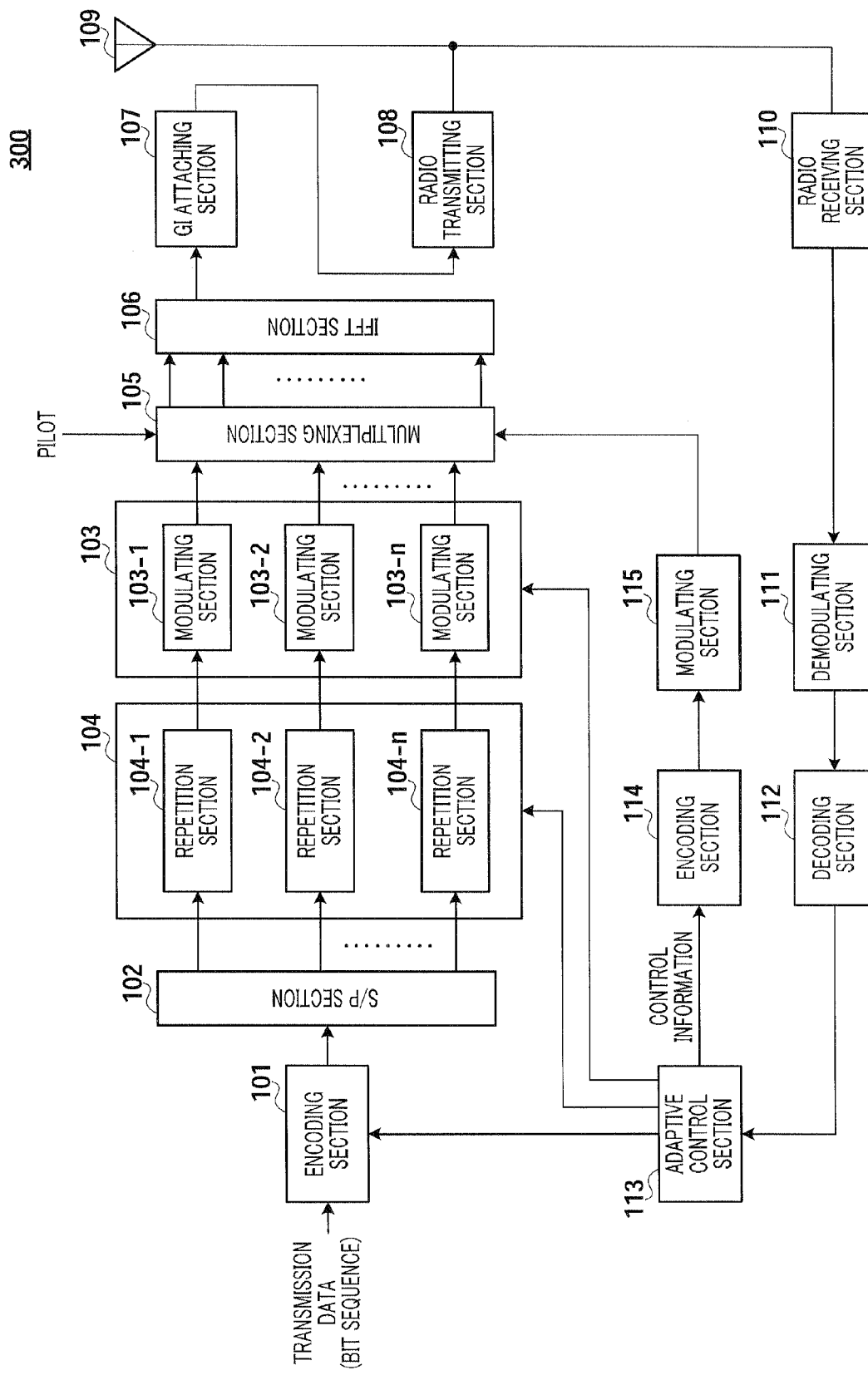
FIG. 12 is a block diagram showing a configuration of a radio communication apparatus on the transmitting side accordingto Embodiment 3 of the present invention.

FIG. 12 illustrates the configuration of radio communication apparatus 300 on the transmitting side according to the present embodiment Following the processing flow in FIG. 11, radio communication apparatus 300 employs a configuration having repetition section 104 before modulating section 103. The other components are the same as in Embodiment 1 (FIG. 1).

Repetition sections 104-1 to 104-n each generate a plurality of the same bits by bit repetition for encoded data, inputted from S/P section 102, for each resource block 1 to n and output a plurality of the same bits to modulating section 103. In this case, similar to Embodiment 1, repetition sections 104-1 to 104-n perform repetition according to the repetition factor, inputted from adaptive control section 113, per resource block. That is, while encoding section 101 encodes all of a plurality of resource blocks at the same coding rate, repetition section 104 performs repetition for each resource block according to the repetition factor controlled by adaptive section 113 on a per resource block basis.

Modulating sections 103-1 to 103-n each generate data symbols by modulating data, inputted from repetition sections 104-1 to 104-n, for each resource block 1 to n and output these data symbols to multiplexing section 105. In this case, similar to Embodiment 1, modulating sections 103-1 to 103-n each modulate resource blocks in the modulation scheme inputted from adaptive control section 113 on a per resource block basis. That is, while encoding section 101 encodes all of a plurality of resource blocks at the same coding rate, modulating section 103 modulates each resource block in the modulation scheme controlled by adaptive control section 113 on a per resource block basis.

Figure 13:
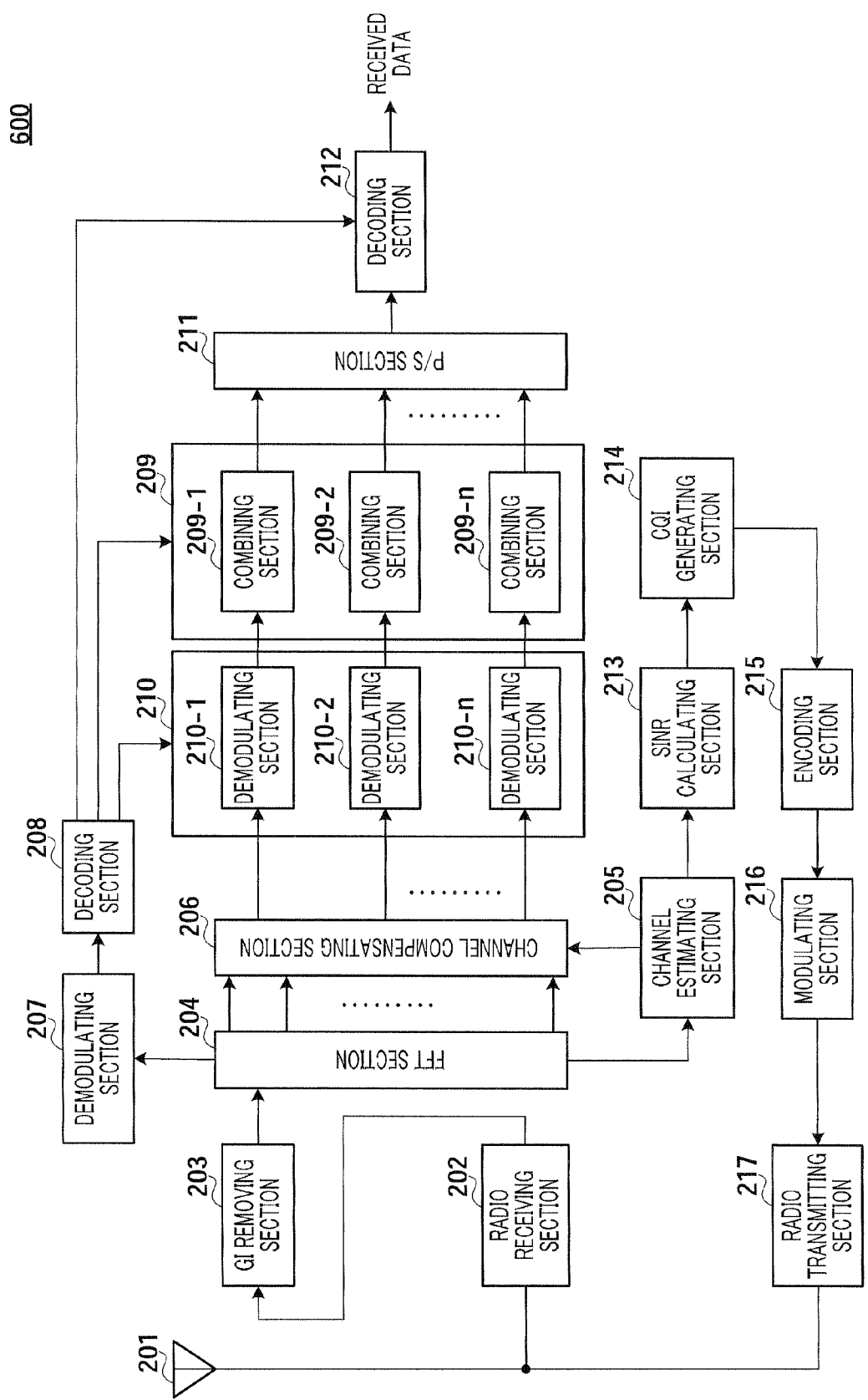
FIG. 13 is a block diagram showing a configuration of a radio communication apparatus on the receiving side according to Embodiment 3 of the present invention.

FIG. 13 illustrates the configuration of radio communication apparatus 600 on the receiving side according to the present embodiment. Radio communication apparatus 600 differs from Embodiment 1 (FIG. 2) in that demodulating section 210 is provided before combining section 209. The other components are the same as in Embodiment 1 (FIG. 2).

Demodulating sections 201-1 to 201-n each demodulate data symbols, inputted from channel compensating section 206, for each resource block 1 to n according to the modulation scheme, inputted from decoding section 208, per resource block, and output the demodulated data to combining sections 209-1 to 209-n.

Combining sections 209-1 to 209-n each combine the demodulated data, inputted from demodulating section 210-1 to 210-n, for each resource block 1 to n in repetition unit according to the repetition factor inputted from decoding section 208, per resource block.

Next, bit repetition will be described below in detail.

BIT REPETITION EXAMPLE 1

In the present example, repetition is performed preferentially for bits of higher priority. For example, when encoding section 101 performs error correcting encoding using systematic code such as turbo code and LDPC code, systematic bits representing transmission bits and parity bits representing redundancy bits are generated. When error occurs with systematic bits, the BER performance is significantly degraded. By contrast, when error occurs with parity bits, the required BER performance can be maintained. That is, systematic bits are higher priority than parity bits. In FIG. 3, when an RF of 1.2 or an RF of 1.5 is selected and repetition is performed for only twenty or fifty percent of bits in the resource block, first, repetition is performed for systematic bits within that twenty or fifty percent range, and, only when there are systematic bits less than twenty or fifty percent of all bits in the resource block, repetition is performed for parity bits within rest of the range. In error correcting encoding using LDPC code, systematic bits corresponding to larger column degree in the parity check matrix used for encoding, support BER performance improvement significantly, and consequently, when error correcting encoding is performed using LDPC code, repetition may be performed in order from the systematic bit corresponding to the large column degree. As described above, by performing repetition for systematic bits of great influence for the BER performance preferentially, the reliability of systematic bits is improved on the receiving side, so that it is possible to improve the BER performance.

BIT REPETITION EXAMPLE 2

Figure 14:
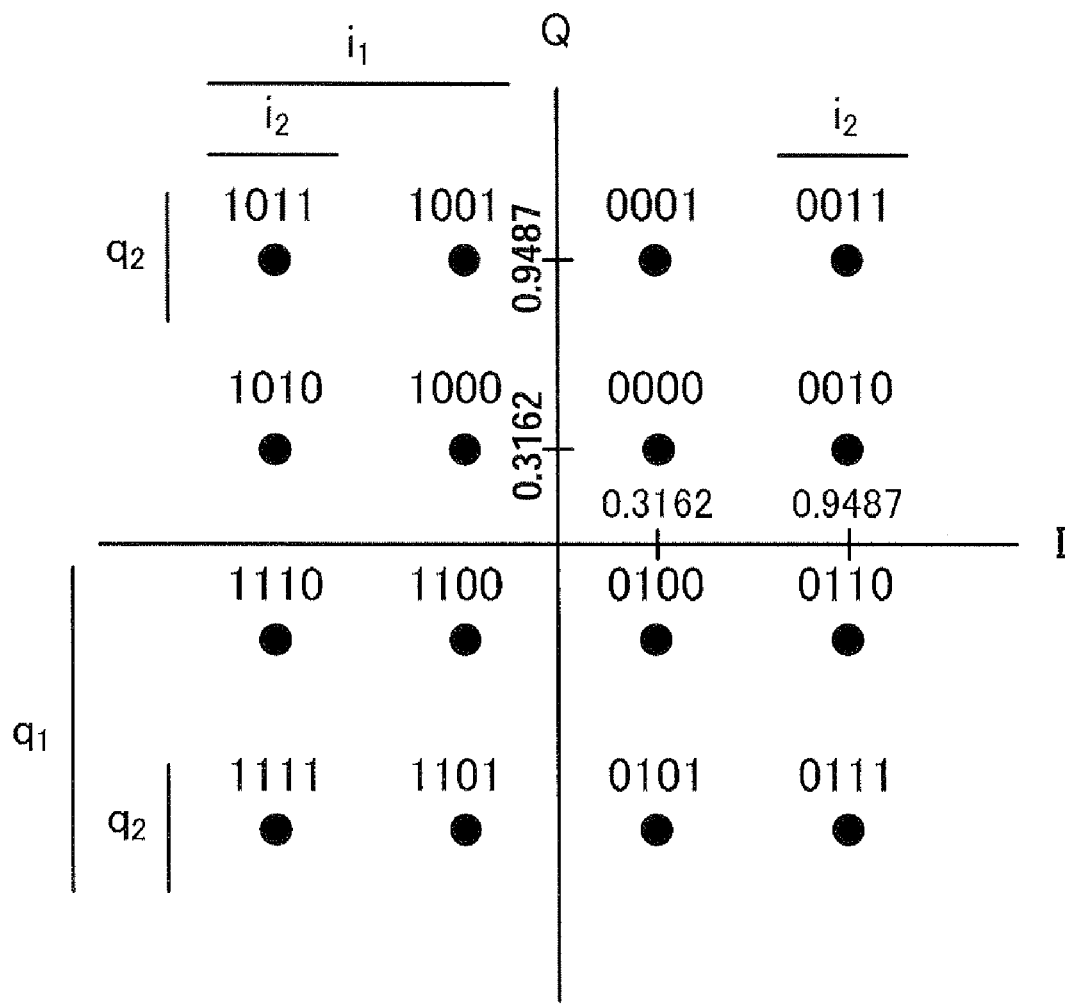
FIG. 14 illustrates a constellation diagram according to Embodiment 3 of the present invention.

In the present example, repetition is preferentially performed for less reliable bits. When modulating section 103 performs QAM modulation, the reliability of each bit in a symbol varies depending on the position of each bit in the symbol. As an example, constellation diagram of 16 QAM modulation is shown in FIG. 14. As shown in FIG. 14, in 16 QAM modulation, one symbol is configured from four bits ($i_1$, $q_1$, $i_2$, $q_2$). As shown in FIG. 14, upon bit decision, the distance between the signal points of $i_2$ and $q_2$ is shorter than for $i_1$ and $q_1$, and, consequently, $i_2$ and $q_2$ are less reliable bits than $i_1$ and $q_1$. In FIG. 3, for example, when an RF of 1.2 or an RF of 1.5 is selected and repetition is performed for only twenty or fifty percent of bits in the resource block, repetition is performed for $i_2$ and $q_2$ within that twenty or fifty percent range. Here, $i_2$ and $q_2$ are two bits of the four bits constituting one symbol and are fifty percent of all bits, and, consequently, when repetition is performed for more than fifty percent of all bits, repetition is performed for $i_1$ and $q_1$ over the range of fifty percent. For example, in the case of $1.5 < RF \leq 2$, repetition is performed for all of $i_2$ and $q_2$ first, and is performed for $i_1$ and $q_1$ for the rest of the range of $((RF-1.5) \times 100)\%$. Thus, by performing repetition for less reliable bits preferentially, the reliability of bits improves and the difference of reliability between bits in a symbol becomes smaller, so that it is possible to improve BER performance.

Here, repetition sections 104-1 to 104-n each may perform bit repetition in different manners. For example, when modulating section 103-1 performs QPSK modulation and modulating section 103-2 performs 16 QAM modulation, repetition section 104-1 may perform repetition according to repetition example 1 and repetition section 104-2 may perform repetition according to repetition example 2.

As described above, according to the present embodiment, the same effect as in Embodiment 1 can be yielded and repetition can be performed taking into consideration priority and reliability per bit, so that it is possible to improve BER performance.

Embodiment 4

According to the present embodiment, symbol repetition is performed for resource blocks with large variation of receivedquality, and bit repetition is performed for resource blocks with small variation of received quality. That is, according to the present embodiment, either symbol repetition or bit repetition is performed for each resource block accordingto received quality per resource block.

Figure 15:
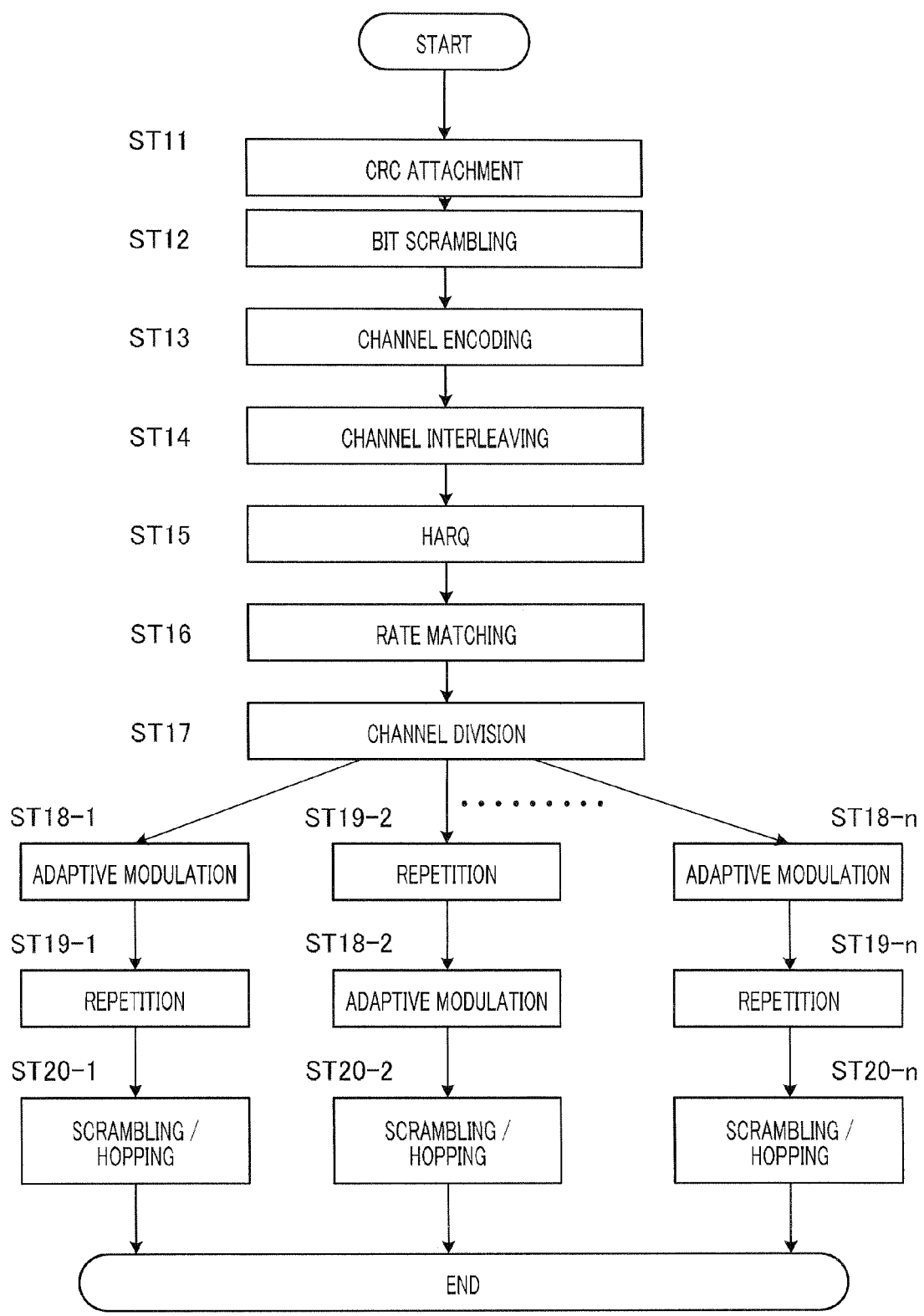
FIG. 15 illustrates a processing flow on the transmitting-side according to Embodiment 4 of the present invention.

FIG. 15 illustrates the processing flow on the transmitting-side according to the present embodiment. The processing-flow of FIG. 15 is different from the flowchart of processing of Embodiment 1 (FIG. 6) in that the order of processing of adaptive modulation ST18-2 and repetition ST19-2 is reverse, that is, adaptive modulation ST18-2 is performed after repetition ST19-2. Thus, while symbol repetition is performed in ST19-2 of FIG. 6, bit repetition is performed in ST19-2 of FIG. 15. That is, according to the present embodiment, resource blocks 1 to n have resource blocks subjected to symbol repetition and resource blocks subjected to bit repetition together.

Here, when the variation of received quality in one resource block is large, combination per symbol yields higher diversity gain than combination per bit. By contrast, when the variation of received quality in one block is small, even if repetition is not performed for all bits constituting one symbol by symbol repetition, by performing repetition for only less reliable bits, it is possible to yield enough diversitygain. Therefore, according to the present embodiment, as shown in FIG. 16, bit repetition is performed for resourceblocks where variation of received quality is small in a resource block, and symbol repetition is performed for resource blocks where variation of received quality is large in a resource block. To be more specific, when an average SINR of resource blocks subject to repetition is higher than an average SINR of all resource blocks, the variation of receivedquality in a resource block is determined to be small and bit repetition is performed for the resource blocks. By contrast, when the average SINR of resource blocks subject to repetition is equal to or less than the average SINR of all resource blocks, the variation of received quality in a resourceblock is determined to be large and symbol repetition is performed for the resource blocks.

Figure 17:
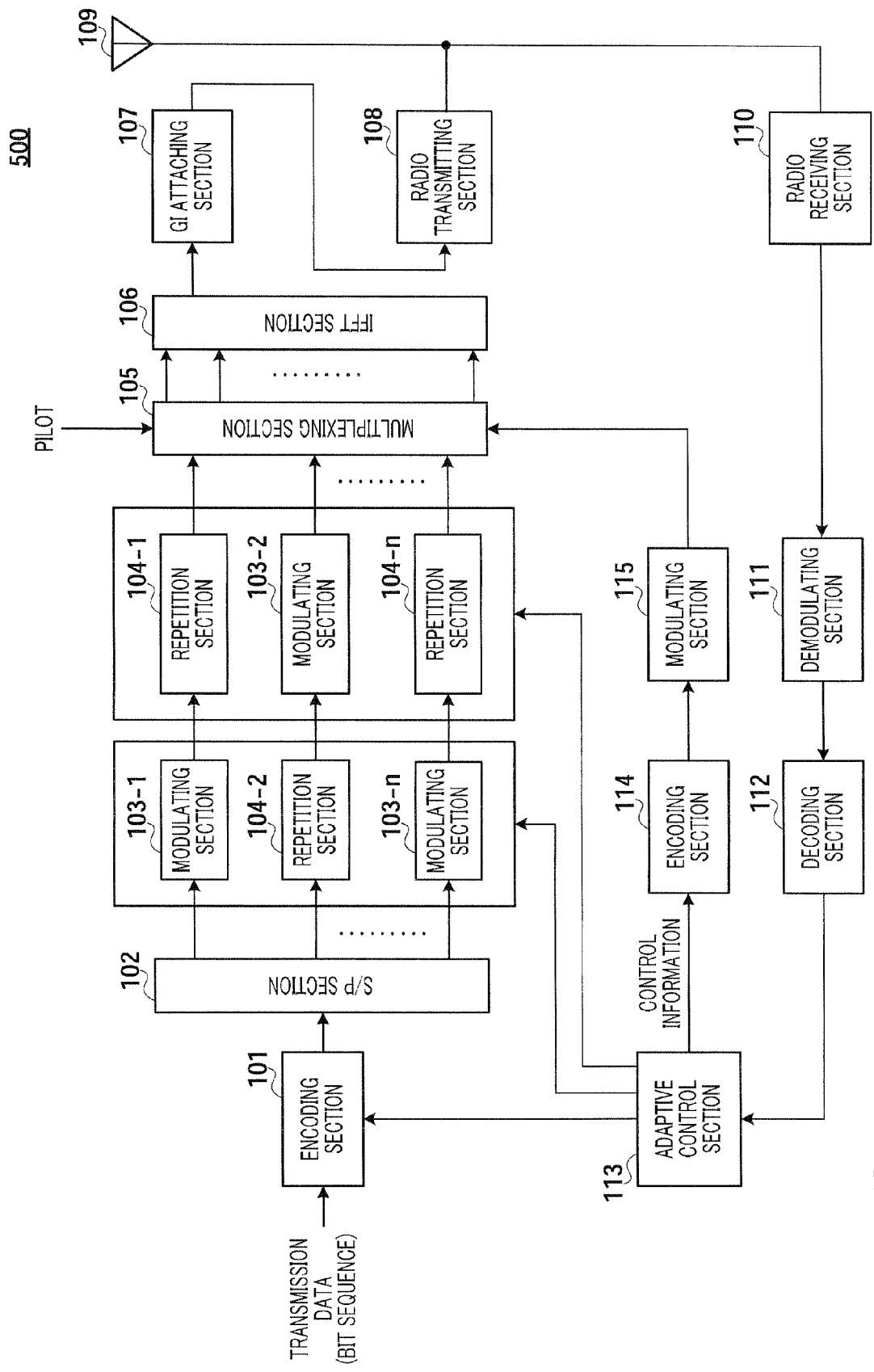
FIG. 17 is a block diagram showing a radio communication apparatus on the transmitting side according to Embodiment 4 of the present invention.

FIG. 17 illustrates the configuration of radio communicationapparatus 500 on the transmitting side according to the present embodiment. In radio communication apparatus 500, to control whether to perform bit repetition or symbol repetition on a per resource block basis, adaptive control section 113 controls the processing order of modulating sections103-1 to 103-n and repetition sections 104-1 to 104-n according to the CQI per resource block. The CQI includes the result of decision of the variation of received quality on a per resource block basis as a variation parameter (see FIG. 16), and, adaptive control section 113 commands modulating sections 103-1 to 103-n and repetition sections 104-1 to 104-n to perform repetition for resource blocks with a variationparameter of "0" (that is, resource blocks with small variation of received quality) before modulation, and perform repetition for resource blocks with variation parameter of "1" (that is, resource blocks with large variation of receivedquality) after modulation.

Adaptive control section 113 generates control information showing the modulation scheme and the repetition factor per resource block, the common encoding rate for all resource blocks and processing order of the modulation and repetition per resource block, and outputs the control information to encoding section 114. This control information is encoded in encoding section 114, modulated in modulating section 115 and inputted to multiplexing section 105. The other components are the same as in Embodiment 1 (see FIG. 1). Similar to the processing flow of FIG. 15, FIG. 17 shows a case where symbol repetition is performed for resource blocks 1 and n and where bit repetition is performed for resource block 2.

Figure 18:
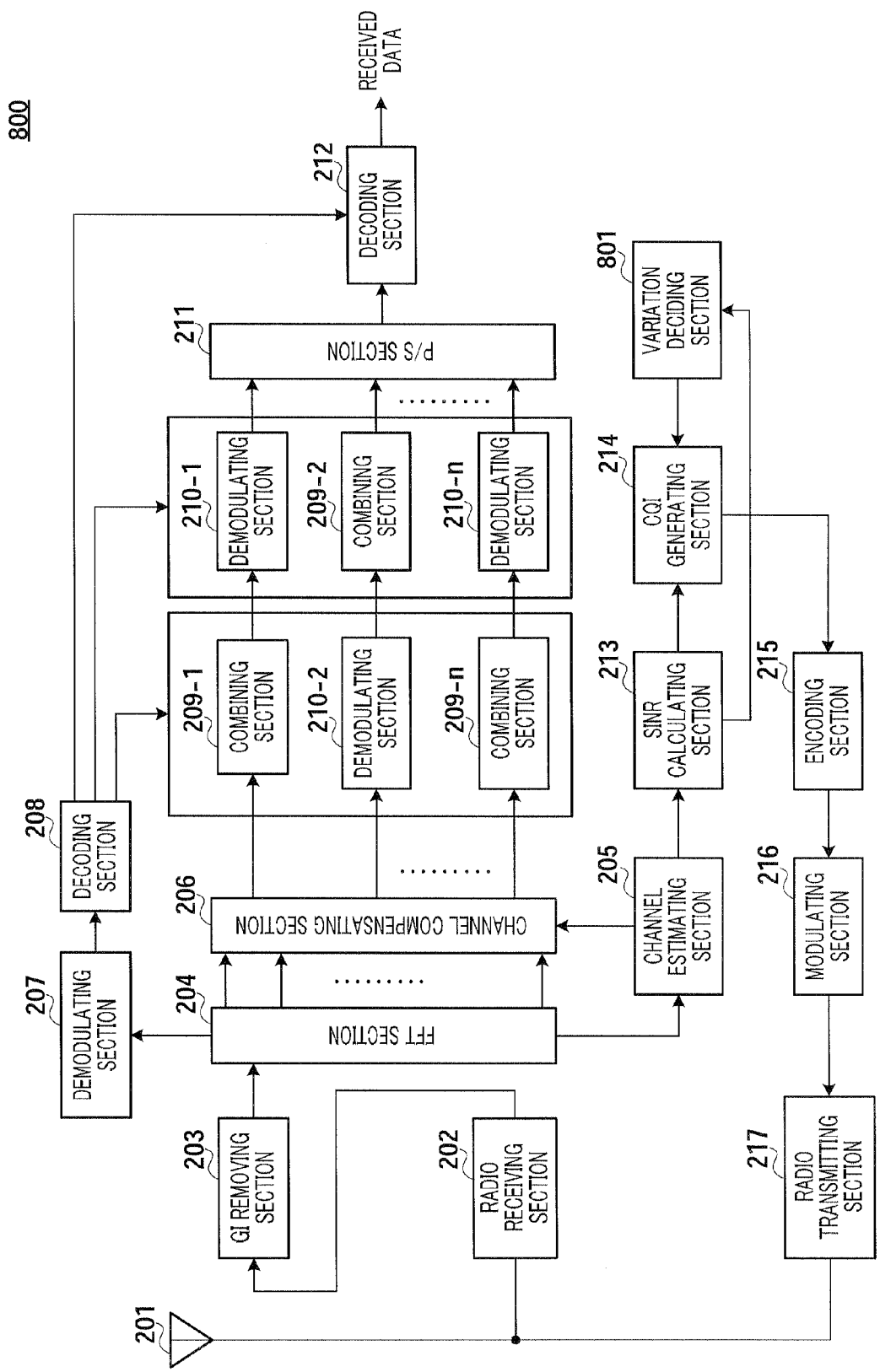
FIG. 18 is a block diagram showing a configuration of a radio communication apparatus on the receiving side according to Embodiment 4 of the present invention.

FIG. 18 illustrates the configuration of radio communication apparatus 800 on the receiving side according to the present embodiment. Radio communication apparatus 800 provides variation deciding section 801, and this variation deciding section 801 decides the variation of received quality of each resource block using the SINR calculated in SINR calculatingsection 213 as shown in FIG. 16. Further, variation deciding section 801 outputs the result of decision as variationparameter to CQI generating section 214.

CQI generating section 214 generates CQI including this variation parameter.

Demodulating section 207 demodulates control information and decoding section 208 decodes the demodulated control information. In the decoded control information, information of the repetition factor per resource block is inputted to combining sections 209-1 to 209-n, information of the modulation scheme per resource block is inputted to demodulating sections 210-1 to 210-n, and information of the common coding rate for all resource blocks is inputted to decoding section 212.

Further, information of processing order of the modulatioand repetition per resource block is inputted to combining sections 209-1 to 209-n and demodulating sections 210-1 to 210-n.In combining sections 209-1 to 209-n and demodulatingsections 210-1 to 210-n, in radio communication apparatus 500 on the transmitting side, when bit repetition is performed for resource blocks, the resource blocks are combined after demodulation, and, when symbol repetition is performedfor resource blocks, the resource blocks are combined before demodulation. FIG. 18 shows a case where, in radio communication apparatus 500 on the transmitting side, symbol repetition is performed for resource blocks 1 and n and bit repetition is performed for resource block 2.

As described above, according to the present embodiment, the same effect as in Embodiment 1 can be yielded and symbol repetition and bit repetition can be switched adaptively according to the degree of variation of received qualityper resource block, so that it is possible to perform suitable repetition in response to the fading variation per resource block and improve BER performance.

Embodiments of the present invention has been described above.

Here, by providing radio communication apparatus 100 in a base station in a mobile communication system and radio communication apparatus 200 or 400 in a mobile station of the mobile communication system, when a multicarrier signal is transmitted on the downlink, it is possible to satisfy requiredreceived quality and yield maximum throughput on the downlink. Further, by providing radio communication apparatus 100 in the mobile station and radio communication apparatus 200 or 400 in the base station, when a multicarrier signal is transmitted on the uplink, it is possible to satisfy required received quality and yield maximum throughput on the uplink.

Here, the base station, the mobile station and the subcarrier may be referred to as "Node B," "UE," and "tone," respectively. Further, repetition may be referred to as "symbol repetition," "bit repetition," or "spreading".

Further, although cases have been described with the above-described embodiments where a resource block is a channel configured from consecutive subcarriers, a resource block may be configured from non-consecutive subcarriers. Further, the resource block may be referred to as "subchannel," "subcarrier block," "subband," or "chunk".

Further, although cases have been described with the above embodiments where adaptive control for a modulation scheme and the repetition factor is performed based on SINR, the adaptive control may be performed based on, for example, SNR, SIR, CINR, received power, interference power, bit error rate, throughput, and MCS (Modulation and Coding Scheme) capable of achieving a given error rate. That is, according to the present invention, adaptive control for a modulation scheme and the repetition factor can be performed based on any of the above-described parameters showing received quality.

In the present embodiment, although the present invention is configured with hardware as an example, the present invention can also be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-238781, filed on Aug. 19, 2005, and Japanese Patent Application No. 2005-287620, filed on Sep.30, 2005, the entire content of which is expressly incorporated by reference herein.

INDUSTRIAL APPLICABILITY

The present invention is applicable to, for example, mobile communication systems.

The invention claimed is:

1. A radio communication apparatus to divide a plurality of subcarriers forming a multicarrier signal into a plurality of resource blocks and performing adaptive control per resource block, the radio communication apparatus comprising:
an encoding section that encodes all of the plurality of resource blocks at a same coding rate;
a control section that controls a modulation scheme and a repetition factor per resource block;
a modulating section that performs modulation per resource block using a controlled modulation scheme; and
a repetition section that performs repetition per resource block using a controlled repetition factor, wherein:
the repetition section performs symbol repetition for a first resource block in the plurality of resource blocks and performs bit repetition for a second resource block in the plurality of resource blocks.

2. The radio communication apparatus according to claim 1, further comprising a table providing a plurality of combinations of modulation schemes and repetition factors,
wherein the control section selects a combination from among the plurality of combinations based on received quality of the multicarrier signal with reference to the table.

3. The radio communication apparatus according to claim 2, wherein a plurality of different repetition factors are set in the table with respect to each of the modulation schemes.

4. The radio communication apparatus according to claim 1, wherein the control section controls a plurality of different repetition factors with respect to the controlled modulation scheme.

5. The radio communication apparatus according to claim 1, further comprising a plurality of tables, wherein each of the tables comprises a plurality of combinations of modulation schemes and repetition factors which are set, and different combinations in different corresponding tables from among the plurality of tables are each set with respect to the same received quality,
wherein the control section selects one of the different combinations according to the received quality with reference to one of the plurality of the different tables according to an interference to noise ratio.

6. The radio communication apparatus according to claim 5, wherein:
the plurality of tables comprises a first table, referred to when the interference to noise ratio is higher than a threshold, and a second table referred to when the interference to noise ratio is lower than the threshold; and
the M-ary modulation number of a modulation scheme set in the first table is higher than the M-ary modulation number of a modulation scheme set in the second table, with respect to the same received quality.

7. The radio communication apparatus according to claim 5, wherein:
the plurality of tables comprises a first table, referred to when the interference to noise ratio is higher than a threshold, and a second table referred to when the interference to noise ratio is lower than the threshold; and
a repetition factor set in the first table is higher than another repetition factor set in the second table, with respect to the same received quality.

8. The radio communication apparatus according to claim 1, wherein the control section selects one of a plurality of combinations of modulation schemes and repetition factors, wherein the selected combination differs with respect to the same received quality, depending on whether an interference to noise ratio is higher or lower than a threshold.

9. The radio communication apparatus according to claim 8, wherein, when the interference to noise ratio is higher than the threshold, the control section selects a combination comprising a modulation scheme comprising a higher M-ary modulation number than another M-ary modulation number in another modulation scheme selected when the interference to noise ratio is lower than the threshold, and a higher repetition factor than another repetition factor in the other modulation scheme selected when the interference to noise ratio is lower than the threshold.

10. The radio communication apparatus according to claim 1, wherein the repetition section is provided after the modulating section and performs the symbol repetition.

11. The radio communication apparatus according to claim 1, wherein the repetition section is provided before the modulation section and performs the bit repetition.

12. The radio communication apparatus according to claim 1, wherein the repetition section preferentially performs the bit repetition for bits of higher priority.

13. The radio communication apparatus according to claim 11, wherein the repetition section preferentially performs the bit repetition for less reliable bits in a symbol.

14. The radio communication apparatus according to claim 1, wherein the repetition section performs the symbol repetition for the first resource block having a large variation of received quality and performs the bit repetition for the second resource block having a small variation of received quality.

15. A radio communication base station apparatus comprising the radio communication apparatus according to claim 1.

16. A radio communication mobile station apparatus comprising the radio communication apparatus according to claim 1.

17. A radio communication method to divide a plurality of subcarriers forming a multicarrier signal into a plurality of resource blocks and performing adaptive control per resource block, the radio communication method comprising:
- an encoding step of encoding the plurality of resource blocks at a same coding rate;
- an adaptive modulating step of adaptively modulating each of the plurality of resource blocks in parallel; and
- a repetition step of performing repetition for each of the plurality of resource blocks in parallel, wherein
- the repetition step performs symbol repetition for a first resource block in the plurality of resource blocks and performs bit repetition for a second resource block in the plurality of resource blocks.

* * * * *